United States Patent [19]
Thome

[11] 3,930,942
[45] Jan. 6, 1976

[54] INDUSTRIAL TECHNIQUE
[75] Inventor: Paul Thome, Saint-Cloud, France
[73] Assignee: Babcock-Atlantique, S.A., Paris, France
[22] Filed: Mar. 22, 1973
[21] Appl. No.: 343,769

[30] Foreign Application Priority Data
Mar. 27, 1972 France .............................. 72.10599

[52] U.S. Cl............. 176/87; 176/19 R; 178/DIG. 1; 178/DIG. 38
[51] Int. Cl............................................. G21c 17/08
[58] Field of Search ......... 176/87, 26, 19 LD, 19 R; 178/DIG. 1, DIG. 37, DIG. 38

[56] References Cited
UNITED STATES PATENTS
3,145,636  8/1964  Hall et al. .................... 178/DIG. 38
3,234,102  2/1966  Brown et al. ........................ 176/87
3,567,576  3/1971  Isaac.................................... 176/87
3,755,079  8/1973  Weinstein et al..................... 176/87

FOREIGN PATENTS OR APPLICATIONS
780,566  3/1968  Canada............................ 176/19 R Primary Examiner—Benjamin A. Borchelt
Assistant Examiner—C. T. Jordan
Attorney, Agent, or Firm—J. M. Maquire, Esq.; J. P. Sinnott, Esq.

[57] ABSTRACT

An illustrative embodiment of the invention provides for a space between the two barriers that ordinarily form the emergency containment system for a nuclear reactor. Tracks set within this space, and a television camera bearing trolley adapted to move on these tracks enables the surface of the inner containment structure to be thoroughly inspected at low cost.

13 Claims, 3 Drawing Figures

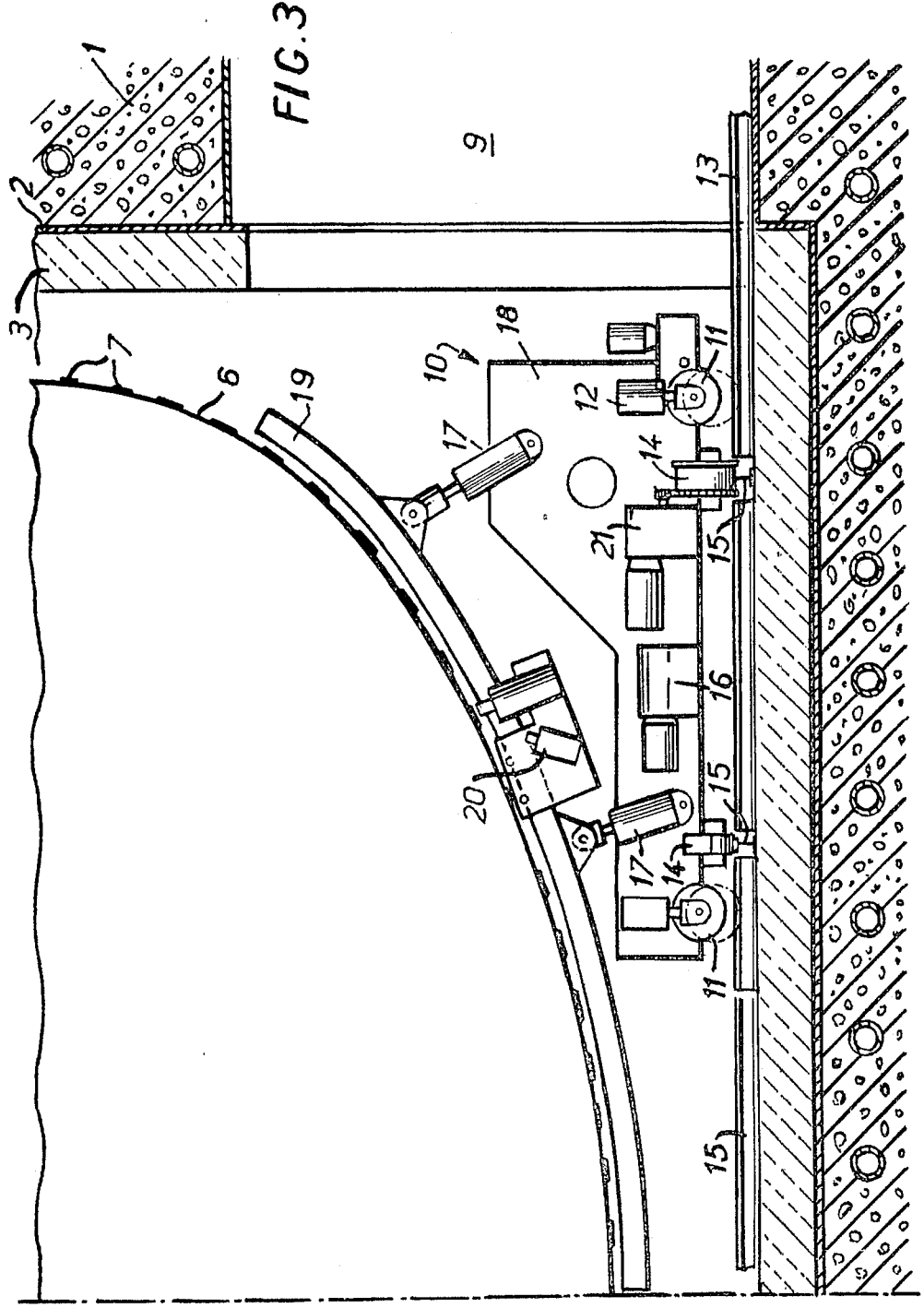

INDUSTRIAL TECHNIQUE

This invention relates to installations for the storage or use of fluids which are harmful or noxious to the environment.

It applies particularly to tanks which contain chemical products or fluids at a very low temperature, nuclear vessels in light water and sodium-cooled installations, and contaminated effluent tanks.

In such tanks, inspection and small repair operations must be carried out quickly in order to minimise intervention times on equipment for which such intervention makes the equipment unavailable for operation.

Such inspection must frequently be carried out under extreme operating temperature conditions (for example in cryogenic fluid tanks or in sodium reactors) which do not allow access by operators.

It would be advantageous to provide automatic fast inspection means as a precaution.

It would also be advantageous to provide automatic safety features for conditions where spacing and obstacles make access difficult.

For safety reasons, the conventional system comprises constructing two fluid-tight barriers. The first barrier contains the dangerous or expensive fluid and the second is adapted to provide a seal in the event of rupture of the first during operation of the installation, and such an accident may be serious and result in prolonged or even complete stoppage of the installation.

Disregarding rupture, even a minimal leakage may result in the installation being unavailable for operation, in which case the secondary barrier is then used simply for recovery of the product and for protective purposes.

The object of this invention is to facilitate examination, maintenance and repair of the first barrier under difficult environmental conditions, and more particularly allow the use of inspection methods which can be applied easily and quickly, and means for logging the zone which is to be monitored. For reasons associated with the environment, and in view of the disorder and expense that may result from non-availability of the equipment, it is also advantageous to provide quick and automatic inspection equipment, fault locating equipment, and equipment for minor work, even work of a type which would not merit any special attention in less dangerous circumstances.

To this end, the invention proposes systematically to promote free access to the primary barrier, to leave the outer surface free of any thermal insulation or any other protective layer, and transfer such insulation or layers to the secondary barrier, and to provide between the two barriers adequate space for the inspection and maintenance operations.

Conveniently, locating members disposed on the surface of the barrier enable those zones which it is required to inspect from time to time to be accurately located.

Advantageously, studs secured to the surface of the primary barrier enable the preceding aims to be accomplished and also facilitate the introduction and operation of automated control or working equipment.

The above steps are not sufficient in every case of application of the invention. To enable equipment of all kinds to be readily used, the space between the primary and secondary barriers must be amply dimensioned. If no other steps were taken, the large space thus formed would be invaded by the fluid in the event of rupture of the primary barrier, and the level of fluid would drop abruptly inside said barrier. This may create extremely dangerous situations. This applies, for example, to nuclear reactors in which, for safety reasons combined with the operation of fission products, the reactor core must not be drained or exposed irrespective of the accidents occurring. The reason for this is that heating due to the gamma effect is sufficient to cause fusion of the core if the latter is not cooled by convection of the coolant fluid.

To obviate this catastrophic situation, the invention proposes to fill the space between the two barriers by displaceable members, thus preventing any excessive fall in the level of liquid in the event of rupture of the primary barrier. In most cases, the space to be filled is in the form of a volume of revolution and the filling members or blocks are in the form of segments bounded by meridian planes and disposed consecutively in a circumferential series. They are placed on a circular track and an access door to the space fitted out in this way is provided in the secondary barrier. In the event of intervention, the door is opened, one of the filling segments is withdrawn if necessary to clear a space into which the inspection, monitoring, repair or, more generally, maintenance equipment is introduced. The assembly formed by the train of filling blocks and the equipment is moved along the outer circular surface of the primary barrier to bring the equipment to a predetermined zone, and work is continued by remotely controlled and remotely monitored operations. If necessary, the space liberated by removal of a segment may also be used for the introduction of personnel to enable them to reach the primary barrier. If required, the filling blocks may act as storage tanks which may, for example, be used to facilitate vessel emptying operations.

On completion of the maintenance operations, the reverse sequence of events takes place, i.e. the train is set in motion to bring the equipment to the opening, the equipment is withdrawn and, where applicable, the missing segment is returned and the secondary barrier closed.

The objects, characteristics and advantages of the invention will also be apparent from the following description of one exemplified embodiment illustrated in the accompanying drawings.

The example selected, which has no limitative character, relates to a sodium-cooled nuclear reactor, but the invention applies equally to light water cooled reactor vessels and other tanks for dangerous products. Referring to the drawings.

Figure 1:
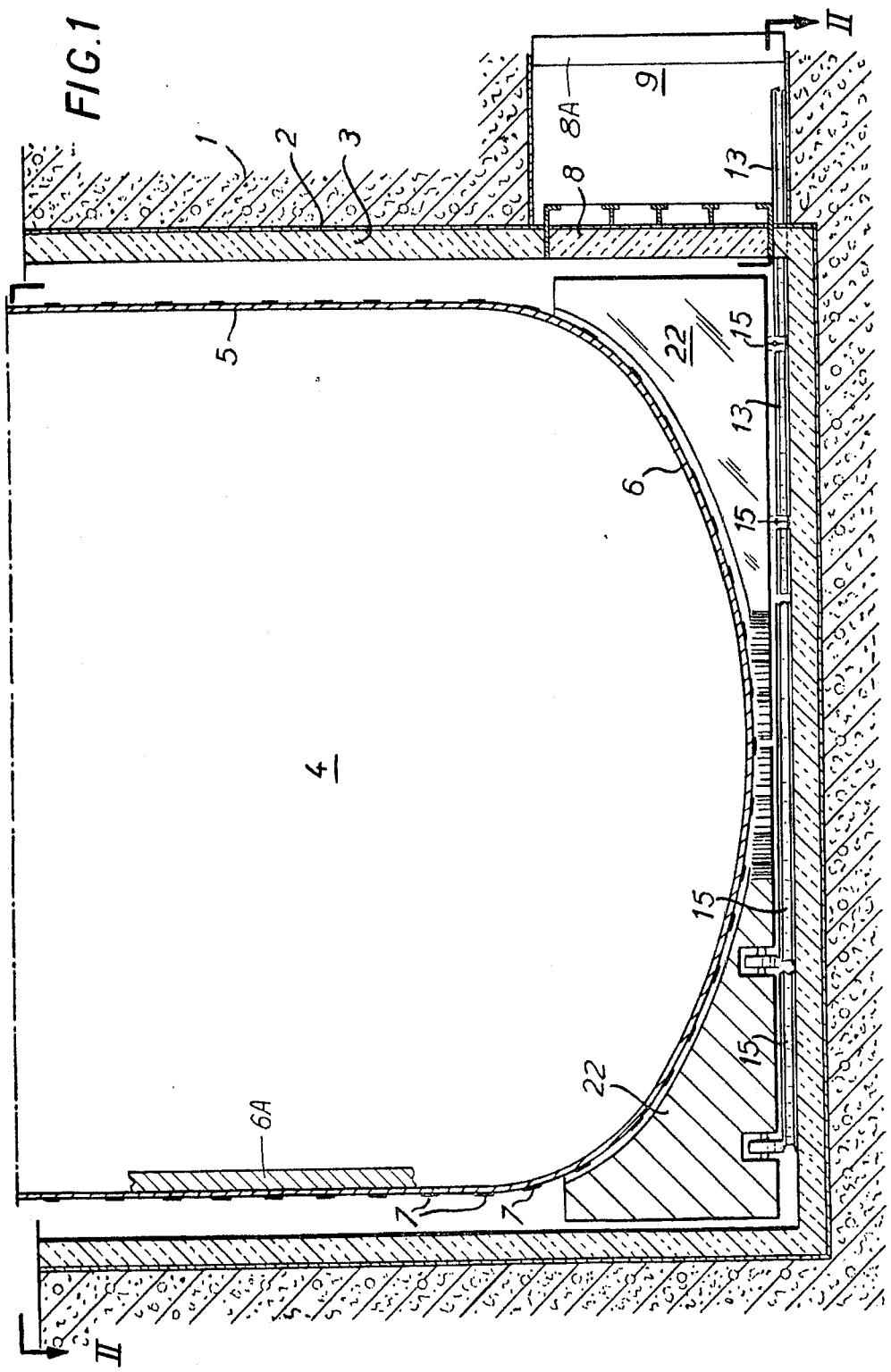
FIG. 1 is a diagram of a liquid sodium vessel for a nuclear reactor.

Referring to the drawings, the inner surface of a buried concrete casing 1 is lined with a metal lining 2 which is in turn lined with a layer 3 of insulating material. A stainless steel vessel 4 having a cylindrical wall 5 and an inverted-dome base 6 is adapted to receive a sodium-cooled nuclear reactor core in accordance with known features of which primary wall 6A is typical, the vessel 4 and the protected casing 1 forming primary and secondary barriers for the sodium.

According to the invention, the bare outer surface of the vessel 4 is provided, at isolated points, with elements 7 which are used for locating purposes and which, if required, may be in the form of fixing studs for inspection, maintenance or repair equipment.

Figure 3:
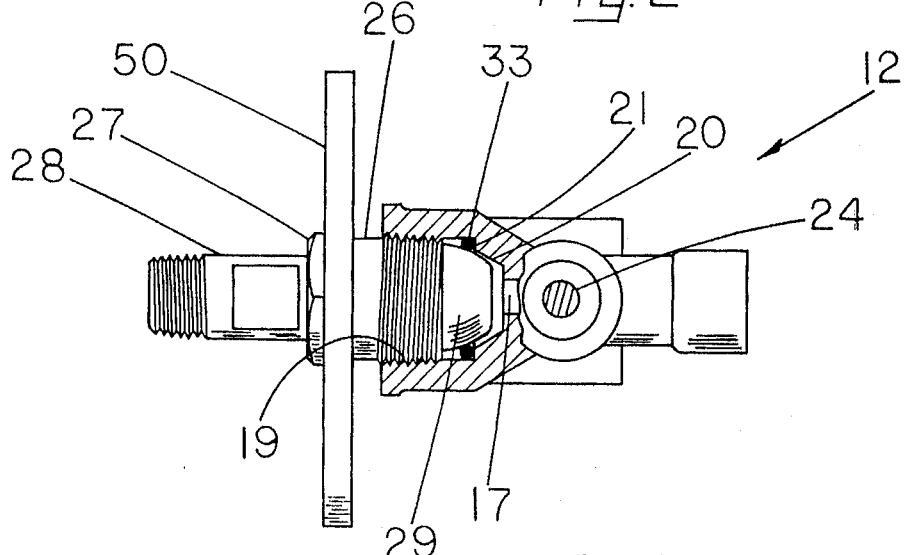
FIG. 3 is an enlarged-scale view of a trolley for supervision and maintenance of the installation.

A door 8 formed in the secondary barrier 2, 3 gives access to the space formed by the two barriers, through the agency of a tunnel 9 and an air-lock 8A. This space is of a size such as to be able to receive a trolley 10 (FIG. 3). The trolley 10 is provided with a wheel set 11 mounted on jacks for vertical adjustment and enabling the trolley to move along the tunnel to the interior of the space over a radial track 13 so that a second wheel set 14 with which the trolley is provided is situated level with a second circumferential track 15 laid on the flat base of the casing 1. A hydraulic system 16 can then actuate the jacks 12 to retract the wheels 11 upwardly and enable the trolley to rest on the track 15. Another two jacks 17 controlled by the hydraulic system 16 and fixed to the trolley frame 18 bear a guide track 19 of a similar profile to that of the base of the vessel 4. This guide track, whose distance from the surface of the vessel can be adjusted by means of the jacks 17, serves as a support and a runway for a television camera 20, movement of the latter along the track being by a hydraulic drive.

A hydraulic motor 21 also acts on at least one of the wheels 14 of the trolley to move it along the circumferential track 15. The resulting assembly enables the camera 20 to sweep the entire outer surface of the base 6 of the vessel 4.

The space formed by the vessel base 6 and the secondary barrier 2, 3 is occupied for the most part by a train of elements 22 disposed to roll on the circumferential track 15, each of these elements being bounded by two meridian planes. At least some of these meridian surfaces are fitted with elements 23 which provide a drive connection between the units 22, simply by contact and thrust and/or by traction.

Safety means (not shown) are also provided to avoid vertical displacement of the elements or trolleys by the effect of the Archimedes thrust which would result from a rupture of the vessel, and thus avoid derailment of this train of elements.

The train of elements 22 is so devised as to leave a free space at the radial track 13 to receive the trolley 10. In a variant, a special filling unit for use as a storage tank 22A may be arranged therein, being adapted to be withdrawn from the casing 1 to be replaced at the required time by the trolley 10.

The units 22 are of any suitable material having some compatability with liquid sodium. In the event of a leakage in the wall of the vessel 1 they have the effect of greatly reducing the fall in the sodium level and prevent any risk of "draining" or exposure of the reactor core.

Inspection and maintenance of the vessel by means of the trolley 10 are carried out as explained hereinbefore, the trolley being capable of exerting sufficient force to displace the train of filling elements 22.

The above-described features according to the invention relate to only one of the possible applications of this invention and therefore have no limitative character. They may therefore be modified and varied in different ways without thereby departing from the scope of the invention. For example, the trolley may be equipped with any suitable means for inspection, analysis, supervision, maintenance and repair, or means for engagement with the vessel. If required, it may also be used for the transportation of the inspection and maintenance personnel. A vertical telescopic guide track having a similar function to that of the track 19 may be used for inspecting and repairing the cylindrical part of the vessel.

As another example, with such a trolley it is possible to place at a predetermined location in the vessel measuring or monitoring or other means borne by equipment fixed on the studs 7; said means can then be withdrawn by a similar operation on completion of servicing, or at any other time favourable to the user.

I claim:

1. An installation for a fluid having an undesirable effect, comprising a normal retaining wall for the fluid, a second wall adapted to retain the fluid in the event of breakdown of the first wall, and a space between the two walls, characterized in that the surface of the first wall disposed facing the second wall is bare and the said space is adapted to receive a trolley which can travel along said surface and which is equipped with at least one repair device for the said installation.

2. Installation according to claim 1, wherein the space contains a filling, the effect of which is greatly to reduce the fall in level in the vessel bounded by the first wall in the event of leakage, said filling being displaceable by the force of the trolley.

3. Installation according to claim 2, wherein the filling is a train of coupled elements.

4. Installation according to claim 1, wherein the second wall has an access door to the inspection space, said door being intended for the trolley.

5. Installation according to claim 4, wherein the second wall is buried, the installation comprising an underground gallery leading to the access door provided with an air-lock.

6. Installation according to claim 1, wherein the device is movable over a guide track having a similar profile to that of the primary wall.

7. Installation according to claim 6, comprising means for adjusting the distance between the guide track and the primary wall.

8. Installation according to claim 1, comprising a longitudinal trolley track laid along the inter-wall space, a transverse trolley track enabling the trolley to enter and leave the space, the trolley having two wheel sets, one for each track, at least one of the said wheel sets being vertically adjustable to allow the trolley to be deposited at will selectively on the two tracks at their intersection.

9. Installation according to claim 1, wherein the space is in the form of a body of revolution.

10. Installation according to claim 1, wherein the trolley bears at least one remotely controlled, remotely monitored inspection, maintenance and repair means.

11. Installation according to claim 1, wherein the surface of the primary wall facing the second wall bears locating elements for inspection and maintenance and repair devices.

12. Installation according to claim 2, wherein the filling is formed by separate blocks adapted to serve as storage tanks.

13. Application of the features according to claim 1 wherein said normal retaining wall is adapted to receive a water reactor vessel.

* * * * *

UNITED STATES PATENT OFFICE
CERTIFICATE OF CORRECTION

Patent No. 3,930,942    Dated January 6, 1976

Inventor(s) Paul Thome

Figure 2:
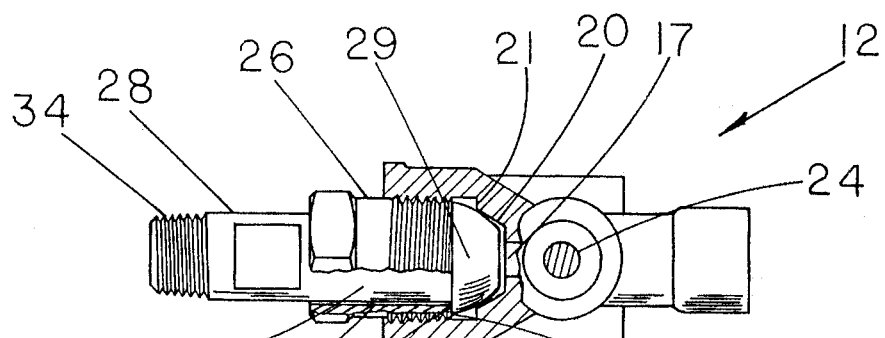
FIG. 2 is a plan-view section on the line II—II in FIG. 1.
Figure 4:
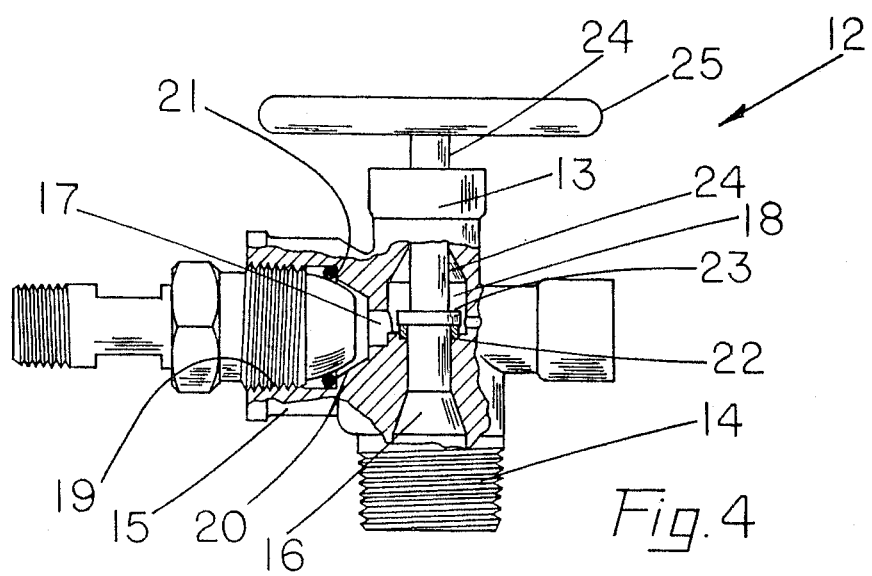
Figure 2:
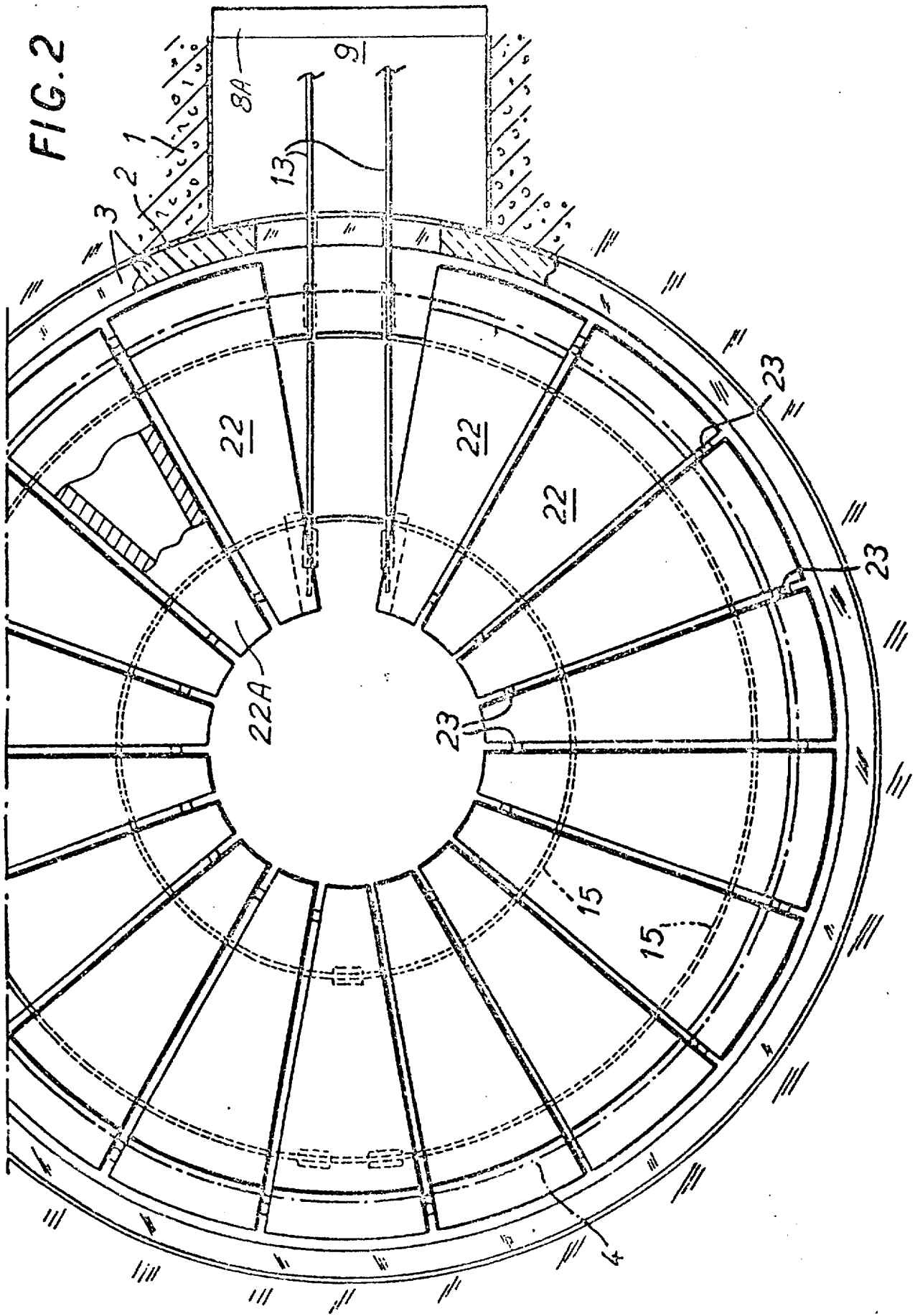

It is certified that error appears in the above-identified patent and that said Letters Patent are hereby corrected as shown below:

Cancel the sheet of drawing containing Figures 2, 3 and 4 and substitute the attached sheet of drawing containing Figure 2.

Signed and Sealed this sixth Day of April 1976

[SEAL]

Attest:

RUTH C. MASON
*Attesting Officer*

C. MARSHALL DANN
*Commissioner of Patents and Trademarks*